United States Patent

Kinsel

[15] 3,670,165

[45] June 13, 1972

[54] OPTICAL TIME DEMULTIPLEXER UTILIZING A SINGLE CONTROL PULSE PER FRAME

[72] Inventor: Tracy Stewart Kinsel, Bridgewater Township

[73] Assignee: Bell Telephone Laboratories, Incorporated, Murray Hill, N.J.

[22] Filed: Dec. 9, 1970

[21] Appl. No.: 96,438

[52] U.S. Cl. ............................................................250/199

[51] Int. Cl. ........................................................H04b 9/00

[58] Field of Search ...................250/199; 350/150, 157, 169

[56] References Cited

OTHER PUBLICATIONS

Applied Physics Letters, Vol. 15, No. 6, Sept. 15, 1969, pp. 192–194.

*Primary Examiner*—Robert L. Richardson

*Assistant Examiner*—Kenneth W. Weinstein

*Attorney*—R. J. Guenther and Arthur J. Torsiglieri

[57] ABSTRACT

A single optical control pulse per frame is utilized to spatially separate the linearly polarized channel pulses of time multiplexed optical PCM signal in an optical time demultiplexer, the basic unit of which comprises an active medium in which birefringence can be optically induced, a polarization separator in optical series therewith to deflect out of the unit channel pulses to be detected, and a delay device which selectively delays the control pulse and causes it to by-pass the separator. A plurality of such units, equal in number to the number of channels to be demultiplexed, are disposed in optical series in the transmission path of the signal.

7 Claims, 1 Drawing Figure

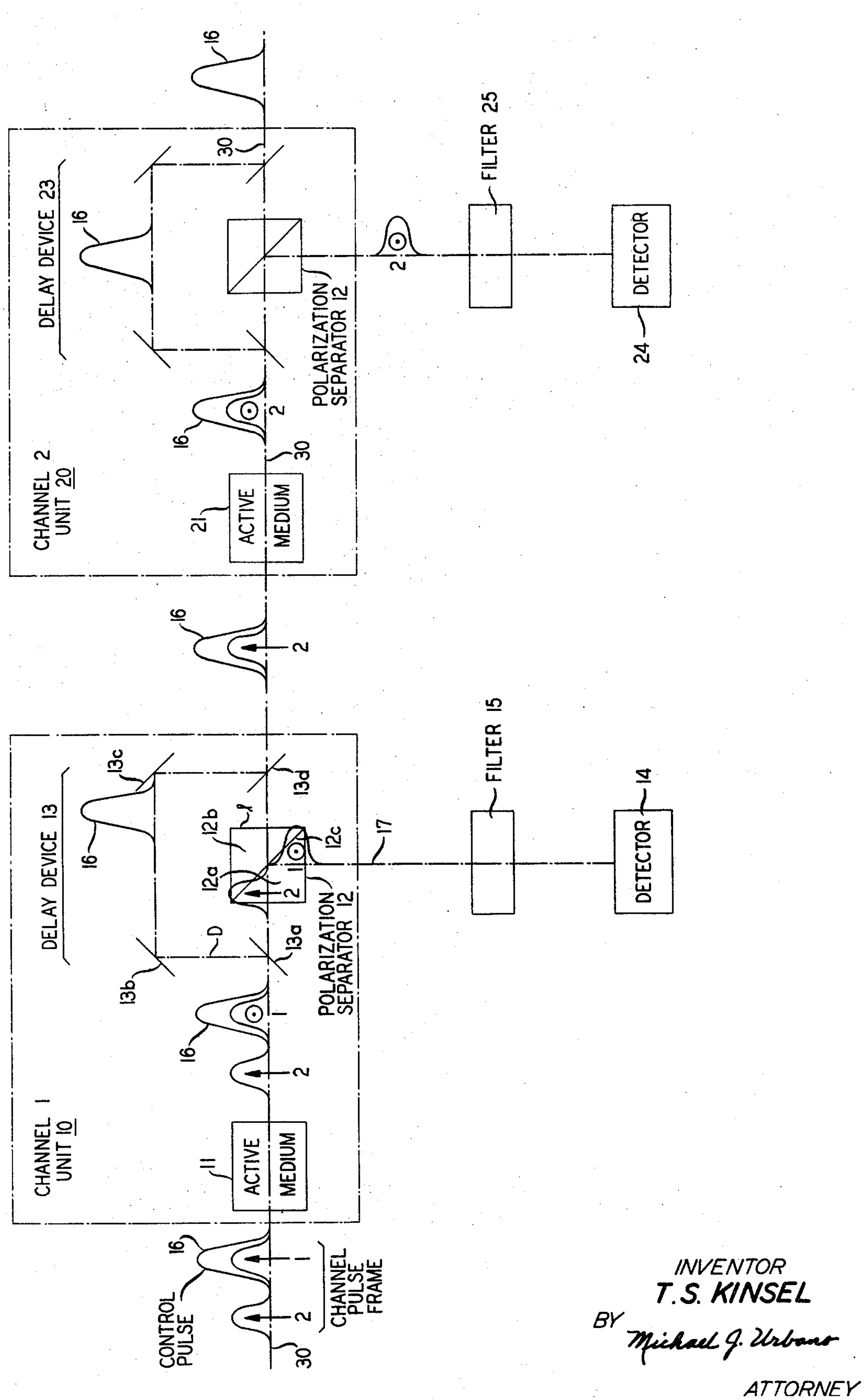
INVENTOR
T.S. KINSEL
BY Michael J. Urbano
ATTORNEY

OPTICAL TIME DEMULTIPLEXER UTILIZING A SINGLE CONTROL PULSE PER FRAME

BACKGROUND OF THE INVENTION

This invention relates to optical receivers and, more particularly, to optical time demultiplexers utilizing collinear control and channel pulses.

The future of the laser in optical communication systems depends to a large extent upon its usefulness as a source of an optical carrier signal. More specifically, because of the well-known noise rejection properties of digital systems, it is desirable that the laser provide a source of optical pulses which can be readily modulated by the selective elimination of pulses in accordance with information to be transmitted (binary PCM). The information carrying capacity of such a system is of course directly related to the pulse repetition rate of the carrier signal, i.e., the higher the repetition rate, the higher the information capacity. It is also advantageous to utilize narrow pulse widths in order to further increase the information capacity by time multiplexing a plurality of pulse trains.

In the optical field, one ready source of such a carrier signal is a mode-locked laser, e.g., a Nd:YAG laser which illustratively generates pulses of 25 picosecond duration at repetition rates of several hundred megahertz depending on the cavity length employed. Since the pulse spacing of such a laser output is of the order of a few nanoseconds, many such picosecond pulse trains may be interleaved, or time multiplexed, so that a single carrier source handles multiple information channels.

At the receiving terminal of such a multiplexed optical PCM system is an optical time demultiplexer which is capable of spatially separating the interleaved channel pulses. Implied, of course, is the requirement that the receiver or demultiplexer be of sufficient bandwidth to respond not only to the higher repetition rates resulting from the interleaving of channel pulses but also to the extremely short duration of the pulses themselves. Receivers suggested in the prior art typically employ a plurality of beam splitters to divide the transmitted carrier signal into a plurality of separate optical detection paths equal in number to the number of channels to be demultiplexed. Within each such path is located an optical gate which is opened by an appropriately synchronized control signal in order to decode each channel. One of the primary disadvantages with this beam splitting approach, however, is the reduction in power in each detection path which thereby increases the sensitivity requirements of the receiver and reduces the signal-to-noise ratio. In addition, the prior art receivers typically employ noncollinear channel and control pulses which increases the complexity of the receiver by requiring a plurality of control pulses, one to open selectively each gate.

It is therefore one object of my invention to time demultiplex a multiplexed optical PCM signal.

It is another object of my invention to accomplish such demultiplexing utilizing a single control pulse per frame.

SUMMARY OF THE INVENTION

These and other objects are accomplished in accordance with an illustrative embodiment of my invention, an optical time demultiplexer in which the basic unit comprises an active medium in which birefringence can be optically induced, a polarization separator in optical series therewith to deflect out of the unit channel pulses to be detected, and a delay device which utilizes dichroic beam splitters to selectively delay the control pulse and cause it to by-pass the separator. A plurality of such units, equal in number to the number of channels to be demultiplexed, are disposed in optical series in the transmission path of the signal. As a first channel pulse in the first frame passes into the first active medium, a linearly polarized optical control pulse, having preferably an optical frequency which is different from that of the channel pulse and being preferably polarized at 45° to the direction of polarization of the channel pulse, is made coincident and collinear therewith.

After passage through the first medium, the polarization of the first channel pulse has been rotated by 90° causing the polarization separator to deflect it out of the transmission path to a first detector. Subsequently, the dichroic beam splitters cause the control pulse to by-pass the separator and to undergo a time delay equal to the uniform spacing of the channel pulses so that upon incidence on the second active medium the control pulse and the second channel pulse are coincident and collinear. The polarization of the second channel pulse is rotated by 90° in the second active medium and the entire process is repeated until all channels in the frame are spatially separated and detected. The channel pulses of subsequent frames are similarly demultiplexed by appropriately synchronized control pulses.

BRIEF DESCRIPTION OF THE DRAWING

These and other objects of the invention, together with its various features and advantages, can be more easily understood from the following more detailed description taken in conjunction with the accompanying drawing, in which the sole FIGURE is an illustrative embodiment of an optical time demultiplexer in accordance with my invention.

DETAILED DESCRIPTION

Basic Structure and Operation

Turning now to the FIGURE, there is shown an optical time demultiplexer in accordance with an illustrative embodiment of my invention for spatially separating and detecting an arbitrary frame of a two channel carrier signal. Of course, the following discussion applies equally as well to a system including an arbitrary number of channels. The basic unit of my demultiplexer, as shown for Channel 1 unit 10, for example, comprises an active medium 11 in which birefringence can be optically induced, a polarization separator 12 in optical series therewith for deflecting channel pulses out of the transmission path 30 to an optical detector 14, and a delay device 13 for selectively delaying a control pulse 16 and for causing it to by-pass separator 12. Channel 2 unit 20 comprises identical components having corresponding numerical designations increased by 10.

In the system shown, both the Channel 1 and 2 pulses and the control pulse 16 are linearly polarized, but preferably at an angle of 45° to one another. Any of several information codes may be utilized to designate logical "1" and "0," e.g., the presence or absence of a vertically polarized channel pulse, or the difference in direction between vertically polarized (in the plane of the paper) and horizontally polarized (perpendicular to the plane of the paper) channel pulses. The former will be utilized herein for the purposes of illustration.

The presence of a vertically polarized pulse in both the Channel 1 and 2 time slots indicates, therefore, a logical "1" in each channel to be detected, respectively, by detectors 14 and 24. In order to spatially separate the Channel 1 pulse, a linearly polarized control pulse is made coincident and collinear therewith. The two pulses enter active medium 11 which under the influence of the control pulse, as will be described more fully hereinafter, changes the polarization of the Channel 1 pulse from vertical (arrow) to horizontal (dot within circle). The channel pulse is then made incident on a polarization separator 12 which deflects out of transmission path 30 channel pulses of horizontal polarization. Consequently, the Channel 2 pulse still being vertically polarized passes through the separator 12, but the Channel 1 pulse being horizontally polarized is deflected along detection path 17 to detector 14. In the event that a spurious portion of the control pulse is also so deflected, a frequency selective filter 15 may be interposed between separator 12 and detector 14 in order to prevent the control pulse from being incident on the detector. The filter 15 is effective for this purpose since, as previously mentioned, the channel and control pulses preferably have different optical frequencies. Actually, however, little control pulse radiation will reach separator 12 normally inasmuch as delay device 13 is designed not only to delay selectively radiation at the control pulse frequency but also to cause it to by-pass separator 12. This result is accomplished by means of dichroic mirrors 13*a* and 13*d* which are highly reflective at the control pulse frequency but highly transmissive at the channel pulse frequency. Mirrors 13*b* and 13*c* are highly reflective at the control pulse frequency and serve to complete the delay path between mirrors 13*a* and 13*d*. The by-pass feature is employed to prevent the control pulse, which is polarized at 45° to the channel pulses, from being partially deflected into detection path 17 by separator 12.

With the Channel 1 pulse thus spatially separated and detected, the Channel 2 pulse and the control pulse 16, which was in the Channel 1 time slot, are made coincident by delay device 13, i.e., the longer path length traversed by control pulse 16 is chosen so as to delay the control pulse by an amount equal to the channel pulse spacing. The physical length of the delay path may be made shorter, and hence the delay device made more compact, by inserting in the path an element having a relatively high index of refraction (e.g., glass). With the Channel 2 pulse and the control pulse now coincident, the two are made incident on the Channel 2 unit 20 which spatially separates and detects the Channel 2 pulse in the same manner as that described with reference to Channel 1 unit 10. The channel pulses of subsequent frames are similarly demultiplexed by appropriately synchronized control pulses typically generated by a mode-locked local laser oscillator at the receiver.

The Active Medium

The active medium utilized herein is characterized by the property that a high intensity (e.g., 20 gigawatt/cm$^2$), plane polarized control pulse optically induces therein changes in its refractive index. These changes, as will be described hereinafter, affect the polarization of a less intense (e.g., 100 times smaller) optical channel pulse transmitted through the medium coincident with, and preferably polarized at 45° to, the control pulse. The refractive index change for that component of the channel pulse light polarized parallel to the electric field of the control pulse in general differs from the refractive index change for light polarized normal to this field. The resulting birefringence, or differential change $\Delta n$ in index of refraction between the parallel and normal components, is proportional to the product of the nonlinear index $n_{2B}$ of the gate medium and the square of the peak electrical field $E_p$ of the control pulse; i.e., $$\Delta n = \tfrac{1}{2}\, n_{2B}\, E_p^2 \qquad (1)$$

where $$E_p^2 = 2 z_0 S\,, \qquad (2)$$

$z_0$ is the impedance of free space and $S$ is the peak power density of the control pulse.

By way of illustration, a picosecond optical control pulse having a peak power density in free space of 22 gigawatts/cm$^2$, which corresponds to a peak optical field of $4.07 \times 10^6$ volts/cm, induces in glass (BK-7), having a nonlinear index of about $2 \times 10^{-13}$ (esu) or $2.22 \times 10^{-22}$ (mks), a differential change in index of refraction of about $1.84 \times 10^{-5}$. Of course, materials with a higher nonlinear index, such as those listed below, will have even greater birefringence.

The following Table I lists the approximate nonlinear indices and passbands of a group of active media particularly useful in accordance with the teachings of this invention. Each of these materials has an intrinsic rise time of about $10^{-15}$ seconds, except carbon disulphide and carbon tetrachloride which have respective rise times of about 2.0 psec, and 0.5 psec.

TABLE I

| Gate Medium | Nonlinear Index | Passband |
|---|---|---|
| | ($\times 10^{-13}$ esu) | (microns) |
| Carbon Disulphide | 200 | 0.3–5 |
| Carbon Tetrachloride | 4 | 0.3–5 |
| Germanium | 8,000 | 1.8–23 |
| Silicon | 2,500 | 1.2–15 |
| Gallium Arsenide | 2,500 | 1.0–15 |
| Diamond | 600 | 0.25–80 |
| Strontium Titanate | 600 | 0.4–6 |
| Cuprous Chloride | 30 | 0.5–11 |
| Glass (heavy flint) | 30 | 0.4–4 |
| Fuzed Quartz | 2 | 0.12–4.5 |
| Glass (BK-7) | 2 | 0.37–3.5 |

The passband of $CS_2$ includes in addition a 1–2 $\mu$m hole centered at about 10.6 $\mu$m. In the case of solid media, high purity crystals free of substantial strain birefringence are preferred.

It should be noted here that the polarization of the channel pulse is technically not rotated, rather it changes continuously from vertical to elliptical (in which the major axis of the ellipse is vertical), to circular, to elliptical (in which the major axis of the ellipse is horizontal) and finally to horizontal, thereby effecting a 90° change in the polarization. To maximize this change in polarization it is preferable that the polarization of the control pulse be at 45° to the polarization of the channel pulses. Moreover, to effect the preferred 90° change in polarization, it is desirable that the channel pulse intensity be considerably less intense than the control pulse intensity so that the channel pulses induce only a negligible amount of birefringence in the active medium. In addition, since the phase retardation of the channel pulse at wavelength $\lambda_s$ is proportional to the product of the length L of the medium in the direction of light propagation and the birefringence $\Delta n$, these parameters are chosen to produce the desired 90° change in polarization; i.e., $$\Delta n L = \tfrac{1}{2}\lambda_s \qquad (3)$$

By combining equations (1)–(3) it can be shown that, in general, the length $L$ of the medium required to produce 90° polarization rotation of the channel pulses is given by $$L = \tfrac{1}{2} = \frac{\lambda_s}{n_{2B} z_0 S} \qquad (4)$$

For example, in glass (BK-7), the length is about 1.44 cm for a control pulse peak power density of about 22 gigawatts/cm$^2$ (at about 1.06 $\mu$m) and a channel pulse power density of about 0.2 gigawatts/cm$^2$ (at 0.53 $\mu$m). Typically, the glass body is 1 centimeter square in cross section.

Polarization Separator

Numerous polarization sensitive devices may be utilized to deflect out of each channel unit the channel pulse being detected. Typically the separator is a Rochon prism comprising glass and calcite prisms, 12*a* and 12*b*, respectively, joined with index matching cement at interface 12*c* with the index of refraction of the glass prism matched to one of the indices of refraction of the calcite prism. Prism 12*a* generally has its *c*-axis either perpendicular or parallel to the plane of the paper.

Differential Delay Element

As mentioned previously, the function of the delay element is to delay the control pulse more than the channel pulses by an amount equal to the channel pulse spacing. One such device, previously discussed, utilizes a dichroic mirror arrangement to cause the channel and control pulses to traverse paths of different length, hence producing differential delay therebetween. Alternatively, dichroic mirrors 13*a* and 13*d* may be replaced by a right angle prism having on the perpendicular faces thereof appropriate antireflection coatings to selectively reflect the control pulse. Moreover, mirrors 13*b* and 13*c* may be replaced by a corner reflector.

It can be readily shown that the delay element 13, including a polarization separator 12 between dichroic mirrors 13*a* and 13*d*, will produce a predetermined time delay $\tau$ if the side legs of the mirror arrangement are of length D satisfying the relationship:

$$D = \tfrac{1}{2}\,[\,l\,(n-1) + c\,\tau\,] \qquad (5)$$

where $l$ is the length of the polarization separator in the direction of light propagation therethrough, $n$ is the index of refraction of the separator (i.e., in a Rochon prism, the index of the calcite prism to which the refractive index of the glass prism is matched), and $c$ is the speed of light in a vacuum. Where, however, the length $l$ of the separator is so small that $l/c$ is negligible compared to the delay time $\tau$, then equation (5) to a good approximation reduces to $$D = \tfrac{1}{2} c \tau \quad (6)$$

For example, assume $\tau = 60$ picoseconds, and assume further a glass-calcite Rochon prism with $l = 0.5$ cm, indices of refraction of 1.486 and 1.658 for the calcite prism 12*a*, and the glass prism 12*b* matched to $n = 1.486$, then equation (5) yields $D = 1.02$ cm.

In an illustrative system, a transmitter includes a Nd:YAG laser mode-locked by an intracavity synchronous phase modulator (see my copending application Ser. No. 827,817 filed May 26, 1969 (Case 1)) to generate continuously plane polarized pulses of 30 picosecond duration (half amplitude) and 60 picosecond spacing at a wavelength of 1.06 $\mu$m and peak power of about 0.2 gigawatts/cm. These pulses are up-converted to 0.53 $\mu$m green light by passage through a second harmonic generator such as barium sodium niobate and are then encoded, typically by the selective elimination of pulses by an appropriate gate or modulator (see, for example, *Proc. IEEE, 56*, 146 (1968) by T. S. Kinsel and R. T. Denton). The encoded pulses of a plurality of channels are then interleaved by an appropriate multiplexer, such as a well-known mirror arrangement, for transmission to a receiver (see, for example, *Proc. IEEE, 56*, 140 (1968) by R. T. Denton and T. S. Kinsel).

Alternatively, the transmitter might utilize a self-pulsing GaAs laser of the type described by J. E. Ripper and T. L. Paoli in *Physics Review Letters, 22*, 1085 (May 26, 1969). Advantageously, this GaAs laser would preferably be a double heterostructure GaAs—GaAlAs laser which can operate continuously at room temperature (see copending application Ser. No. 33,705 filed on May 1, 1970, I. Hayashi Case 4).

At the receiver the pulses are demultiplexed by means of the inventive apparatus of the instant invention. Accordingly, the control pulse is typically a high intensity (e.g. 22 gigawatts/cm$^2$ pulse of about 30 picosecond duration plane polarized at 45° to the channel pulses. The control pulses, one per frame, are generated by a local laser oscillator synchronized with transmitting laser by any of several means well known in the art, e.g., by means of a clock signal transmitted along a cable from the intracavity modulator of the transmitter or by means of a local drive signal derived by photo-detecting the repetition rate of the received channel pulses. In either case, a control pulse is made coincident with the Channel 1 pulse of the first frame and the two are made incident upon a BK–7 glass medium 11 which is about 1.44 cm long to produce 90° change in polarization of the Channel 1 pulse at the operating wavelength of 0.53 $\mu$m.

Next, the rotated Channel 1 pulse and the collinear and coincident control pulse are made incident on dichroic mirror 13*a* of delay element 13. Mirror 13*a* is typically a multilayer dielectric mirror designed by means well known in the art to have a high reflectivity at 1.06 $\mu$m and a low reflectivity at 0.53 $\mu$m. Consequently, the control pulse at 1.06 $\mu$m traverses a path defined by mirrors 13*a*, 13*b*, 13*c* and 13*d*, by-passing polarization separator 12. On the other hand, the green Channel 1 pulse at 0.53 $\mu$m is transmitted by mirror 13*a* to separator 12, typically a calcite Wollaston prism about 0.5 cm long. This channel pulse is, as described previously, reflected at interface 12*c* out of the transmission path 30 to a detector 14, typically a germanium avalanche photodiode. Filter 15 is typically a multilayered, dielectric interferometric filter designed by well known means to reject radiation at 1.06 $\mu$m and hence prevent spurious control pulse radiation from being incident on the detector.

As previously calculated, the path length D between mirrors 13*a* and 13*b*, and between mirrors 13*c* and 13*d*, is chosen to be about 1.04 cm in order to delay the control pulse by an amount equal to the channel pulse spacing of 60 picoseconds. Consequently, the Channel 2 pulse and the control pulse are coincident at dichroic mirror 13*d* which transmits the Channel 2 pulse and reflects the control pulse to collinearity therewith along transmission path 30. The two coincident pulses are then made incident upon the Channel 2 unit 20 where the Channel 2 pulse is spatially separated and detected. The process is repeated until all channel pulses in the frame are detected. Channel pulses in subsequent frames are similarly demultiplexed by appropriately synchronized control pulses of the local oscillator.

It is to be understood that the above-described arrangements are merely illustrative of the many possible specific embodiments which can be devised to represent application of the principles of my invention. Numerous and varied other arrangements can be devised in accordance with these principles by those skilled in the art without departing from the spirit and scope of the invention. In particular, my invention contemplates the demultiplexing of less than all of the channels, for example, at a channel dropping station intermediate the transmitter and ultimate receiver. In such instances, the subset of channels to be dropped would preferably be grouped together in sequence in each frame and, of course, the control pulses in each frame would be synchronized with the first channel pulse in each such subset.

What is claimed is:

1. An optical time demultiplexing system utilizing a single optical control pulse per frame for spatially separating into separate optical detection paths a plurality of sequential, linearly polarized optical channel pulses comprising a plurality of gating units equal in number to the number of channels per frame to be separated, said units being disposed optically in series with one another in the transmission path of said channel pulses, each of said units comprising an active medium in which birefringence can be optically induced, a polarization separator in optical series with said medium for deflecting selected ones of said channel pulses into a selected detection path, a differential delay device for delaying said channel and control pulses with respect to one another and for causing said control pulse to by-pass said separator, and a detector for receiving channel pulses deflected from said transmission path by said separator, means for applying to the active medium of one of said units a high intensity, linearly polarized optical control pulse coincident and collinear with the passage of a corresponding channel pulse therethrough to rotate by substantially 90° the polarization of said channel pulse, thereby causing said channel pulse to be deflected by the polarization separator of said one unit to incidence on the detector of said unit, said delay device of said one unit being effective to delay selectively said control pulse by an amount substantially equal to the spacing of said channel pulses, thereby to cause the next one of said units to deflect said next channel pulse from said transmission path into the next one of said detection paths.

2. The system of claim 1 wherein said channel and control pulses are linearly polarized at an angle of about 45° to one another.

3. The system of claim 1 wherein said polarization separator comprises a Rochon prism.

4. The system of claim 1 including a separate filter disposed between each of said detectors and each of said separators to prevent spurious control pulse radiation from being incident on said detectors.

5. The system of claim 1 wherein said delay device comprises a first dichroic surface disposed in said transmission for selectively reflecting said control pulse into a separate, optically longer delay path, said first surface being highly transmissive to said channel pulses, a second dichroic surface disposed in said transmission path in spaced relation to said first surface, means for reflecting said control pulse from said delay path to incidence on said second surface, said second surface being highly transmissive to said channel pulses and highly reflective to said control pulse and being disposed so as to reflect said control pulse to propagation along said transmission path, and said polarization separator being disposed in said transmission path between said first and second dichroic surfaces.

6. A method of spatially separating into separate optical detection paths a plurality of sequential, linearly polarized optical channel pulses by means of a single optical control pulse per frame comprising the steps of a. making a preselected channel pulse incident upon a medium in which birefringence can be optically induced, b. making a high intensity, linearly polarized optical control pulse coincident and collinear with said channel pulse in said medium to rotate by substantially 90° the polarization of said channel pulse, c. making said channel pulse incident on a polarization sensitive device to deflect said channel pulse to a detector, d. causing said control pulse to by-pass said device and to be delayed in time by an amount substantially equal to the channel pulse spacing, thereby to cause said control pulse to be coincident and collinear with the next one of said channel pulses, and e. repeating steps (a)–(d) until all such channel pulses are spatially separated and detected.

7. The method of claim 6 wherein said control and said channel pulses are polarized at an angle of about 45° to one another.

* * * * *